United States Patent [19]
Russell

[11] Patent Number: 4,750,194
[45] Date of Patent: Jun. 7, 1988

[54] CLOCK SYNCHRONIZATION SYSTEM

[75] Inventor: Harry D. Russell, Jefferson, Ala.

[73] Assignee: United States Pipe and Foundry Company, Birmingham, Ala.

[21] Appl. No.: 21,928

[22] Filed: Mar. 5, 1987

[51] Int. Cl.⁴ .............................................. H04L 7/00
[52] U.S. Cl. ................................. 375/107; 340/825.14
[58] Field of Search ............... 375/107, 109; 364/569, 364/200 MS File, 900 MS File; 370/44; 340/825.06, 825.14, 825.15

[56] References Cited
U.S. PATENT DOCUMENTS

| | | | |
|---|---|---|---|
| 3,335,222 | 8/1967 | Davis et al. | 370/44 |
| 3,720,791 | 3/1973 | Yade et al. | |
| 4,498,167 | 2/1985 | Bowen | 370/44 |
| 4,607,257 | 8/1986 | Noguchi | 340/825.14 |

Primary Examiner—Michael A. Masinick
Assistant Examiner—Marianne Huseman
Attorney, Agent, or Firm—James W. Grace; Charles W. Vanecek

[57] ABSTRACT

This invention relates to a clock synchronization system capable of recording data and the time of initiation of data which is transferred from one location to another.

5 Claims, 1 Drawing Sheet

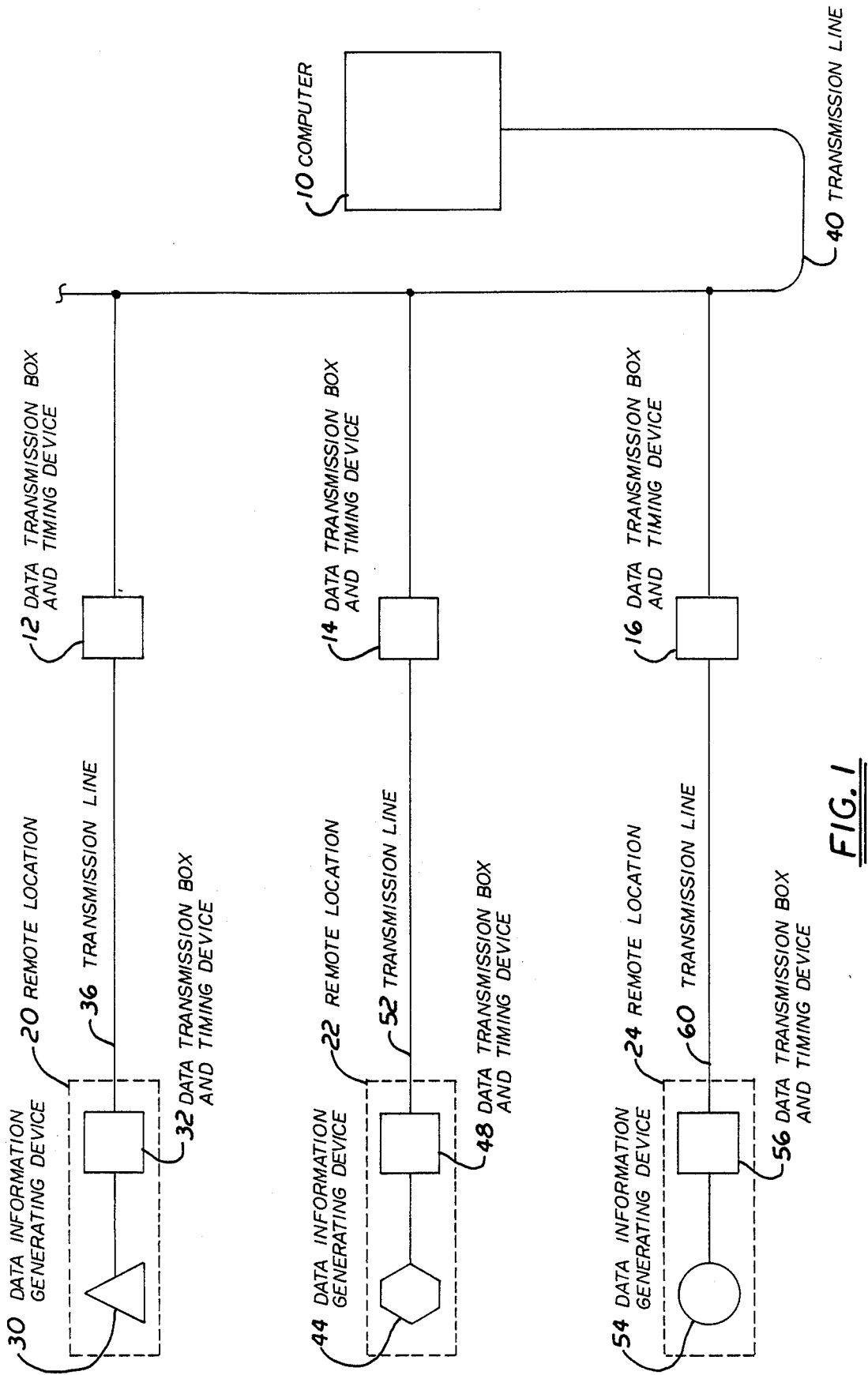

CLOCK SYNCHRONIZATION SYSTEM

FIELD OF THE INVENTION

This invention relates to a clock synchronization system capable of recording data and the time of initiation of data which is transmitted from one location to another.

DESCRIPTION OF THE PRIOR ART

In recording data or pieces of information initiated at one location and subsequently recorded at a second location, the time of origination of the data may become important. For example, it may be necessary to record the processing steps in making an article and the time at which each step of the process has taken place. This is particularly important when it is desired to pinpoint the exact timing sequence of the steps in the process or to determine the operating conditions at a previous time in the process.

If the time of a step in the process at one location is established by a clock at that location and the time of reception of the data at a second or central location is established by a clock at the central location, then the two clocks must be accurately synchronized so that the exact time of the initiation of that step can be recorded. If the two clocks are not properly synchronized, the recorded time of the initiation of the step may be inaccurate. Obviously, the synchronization of clocks at different locations can be a difficult, if not, impossible task.

In order to avoid the problem of synchronizing clocks at various locations, the present invention uses a computer which records data at a central location and accounts for the time lapse between the time of initial generation of the data and the reception of the data at the computer at the central location. There is one clock in the computer at the central location which computer receives the data for recordal and also receives information indicating the amount of time lapsed between the initial recording of the data and the time of sending the data to the central location. The time lapse is measured at the transmitting location and at intermediate transmitting locations which do not need clocks but merely devices for measuring the lapsed time.

SUMMARY OF THE INVENTION

It has been found that the time of initiation of a piece of information at a remote location can be recorded at a central location by using the time lapse between initiation of the piece of information and the time of transmission of the piece of information to a central location to in effect simulate the resetting of a clock at the central location.

An object of this invention is to provide a novel information recording system in which data is recorded using only one clock device and multiple data initiation and transmisson sources.

Another object of this invention is to provide a novel information recording system in which a determination of time lapse between the initiation of data and reception of the data at the computer is used to record the real time of initiation of the data.

BRIEF DESCRIPTION OF THE DRAWINGS

FIG. 1 is a block diagram illustrating the clock synchronization system of the present invention.

Referring now to FIG. 1, there is shown a data acquisition computer 10 which includes a master clock (not shown). The master clock generates the time and date information which will be recorded along with the data received from remote locations and may be a battery backed clock calendar module, such as one sold by Maynard Electronics Company. The clock keeps accurate date and time information and is connected to computer 10 so that computer 10 can subtract lapsed time information from the clock time to establish and record the actual time of the initiation of the incoming data.

Computer 10 may be a computer model IBM-AT made by International Business Machines Company. Computer 10 has a hard disc to store received data.

Block 12 is a data transmission box. The data transmission box 12 may have a Z-80 microprocessor, 8K of RAM or Random Access Memory and 8K of EPROM or Erasable Programmable Read Only Memory.

Blocks 14 and 16 are data transmission boxes identical to data transmission box 12.

Data transmission boxes 12, 14 and 16 function to time the age of the data or information received by the data transmission boxes and to keep track of the time that the data remains in the data transmission box before it is transmitted to computer 10.

Data transmission boxes 12, 14 and 16 are mounted at the central location near computer 10 in the main office.

Remote locations where the data to be recorded by computer 10 originates are designated by numerals 20, 22 and 24. While for purposes of explanation only, three locations are shown, there may be many locations depending upon the size and capacity of computer 10.

For example, location 20 may be in the casting area of a factory. At location 20, there is a data information generating device 30 and a data transmission box 32. For convenience, data information generating device 30, shown as a triangle, may be a Quantovac which is an instrument available from Applied Research Laboratories and is capable of determining the chemistry of a sample of metal, such as that used to cast a pipe. The Quantovac generates quantitative data relating to the chemical composition of the metal and follows a prepared program to record the data. At the time the data is recorded and transmitted to data transmission box 32, data transmission box 32 stores the data and a timing mechanism begins to keep the storage time of the data in the data transmission box 32. Data transmission box 32 transmits the data to data transmission box 12 over line 36 along with the signal which represents the storage time of the data in data transmission box 32. Data transmission box 12 stores the data and the storage time of the data in transmission box 32 and also begins to measure the time over which the data remains in data transmission box 12 until data transmission box 12 transmits the data to computer 10 over transmission line 40. There may be a delay or time lag between the time the data is received in data transmission box 12 and the time the data can be transmitted from data transmission box 12 to computer 10. This delay may be caused by the fact that another data transmission box may be transmitting data and data transmission box 12 may have to wait its turn for access to computer 10.

During the delay period, data transmission box 12 notes the storage time of the delay period and adds that amount of time to the time period received by data transmission box 12 from data transmission box 32. The data, however, remains the same.

Computer 10 receives the data from data transmission box 12 and records the data on a suitable recording medium such as a hard disc. Computer 10 also received the time delay information from data transmission box 12 and subtracts the time delay period from the time then indicated by its internal clock which keeps accurate date and time. By subtracting the accumulated time delay, from the then current time of day as kept by its clock, computer 10 then records the real time that the original data was transmitted from the Quantovac 30 which is the time at which the data was originally generated.

An example will demonstrate the operation of the system.

Assume that the data generated in the Quantovac 30 indicate a carbon content of 3.2% for a sample of metal and that this information was taken at 10:00:00 AM. This information is transmitted from Quantovac 30 to the data transmission box 32 at 10:00:00 AM. Assume that data transmission box 32 cannot send the data to data transmission box 12 for 0.50 seconds. The period of 0.50 seconds is measured within data transmission box 32 by its internal timing system which measures only the delay or storage time the information remains in data transmission box 32 between receipt of the data and the transmission of the data to data transmission box 12. When the data are sent from data transmission box 32 to data transmission box 12 a signal indicating a delay of 0.50 seconds accompanies the data.

Data transmission box 12 receives the data indicating a carbon content of 3.2% and also the signal of the time delay time of 0.50 seconds. Data transmission Box 12 stores the data and counts the storage time until data transmission box 12 can transmit the data to computer 10 over transmission line 40. The information is transmitted to computer 10 along with the storage sum of the time received from data transmission box 32 and the storage time within data transmission box 12.

Assume that the delay time within data transmission box 12 between receipt of the data from data transmission box 32 and the transmission of the data to computer 10 is 2 seconds. Data transmission box 12 transmits the data (carbon content of 3.2%) and the total delay time of 2.50 seconds to computer 10. The delay time of 2.50 seconds is the sum of the delay of 0.5 seconds in data transmission box 12 and the 2.0 seconds delay in data transmission box 32. At this time, the running clock in computer 10 will be 10.02.50 and computer 10 will subtract 2.50 seconds (the time delay signal received from data transmission box 12) from its clock time of 10.02.50 seconds and record the time of initiation of the data at Quantovac 30 as 10.00.00 AM. Thus, the initial time of the generation of the data is recorded with the data without having a clock in the Quantovac 30, the data transmission box 32 or data transmission box 12.

In a similar manner at station 22, data generated in a programmable controller 44 on a casting machine, delivering size, class, weight, joint configuration and serial number for each pipe is transmitted to data transmission box 48 which stores the data in anticipation of retransmission to data transmission box 14. Data transmission box 48 calculates the storage time that the data from programmable controller 44 is held, starting with the initial receipt of the data. The delay time is transmitted by data transmission box 48 along with the data to data transmission box 14 over transmission line 52. Data transmission box 14 upon receipt of the initial data, starts its timing device to record the delay time elapsed from the time it receives the initial data until it transmits the data to computer 10 over transmission line 40. Data transmission box 14 will add its own delay time to the delay time it receives from data transmission box 48 when it transmits the data to computer 10.

In a like manner a number of additional data generating stations can be added to the network each with its own data generating device and additional data transmission boxes. For example, initiating station 24 located at a different station can be added. Station 24 having a data generating device 54 and a data transmission box 56 is connected to data transmission box 16 over transmission line 60 and then over common transmission line 40 to central computer 10.

Computer 10 can be programmed to scan data transmission boxes 12, 14 and 16 and to sequentially trigger these boxes to send the data stored therein. In data transmission boxes 12, 14, 16, 32, 48, and 56, it is necessary to have only a timing device which will measure the storage time the data is held in each box and a means for adding the previous occuring storage times to the storage time generated in each box.

If there is a fixed, measurable time delay period of transmitting data on the transmission lines, such as transmission line 36, this fixed time delay can be preset into the delay timing mechanism of one of the data transmission boxes, such as number 12, to increase the accuracy of the recorded real time for the data.

There is shown and described a clock synchronization system which requires only one master clock at a central location to record the time of initiation of data generated at other locations. It will be apparent that modifications and changes will occur to those skilled in the art without departing from the scope of the appended claims.

I claim:

1. A clock synchronization system for recording data and the real time of generation of said data comprising a central computer adapted to receive data from a remote location, said computer having a time measuring device capable of keeping accurate real time, at least one data generating device located at said remote location and transmission means connected between said data generating device and said computer, said transmission means having a timing mechanism adapted to measure the time interval between generation of said data and the time of transmission of said data to said computer, said transmission means being adapted to transmit said data and said time interval to said computer, said computer being adapted to subtract said time interval from said real time, whereby said data and the real time of initiation of the generation of said data are recorded by said computer.

2. A clock synchronization system as recited in claim 1 in which said data generating device is a device adapted to measure certain operating conditions during a process.

3. A clock synchronization system as recited in claim 1, in which said computer incorporates a clock which records real time and means for subtracting a time period representing a delayed time period from said real time, whereby data generated at an earlier time can be recorded in said computer as of the earlier real time of generation of said data.

4. A clock synchronization system as recited in claim 1, in which said transmission means comprises a data transmission box located at said remote location and a second data transmission box located at said central location, each of said transmission boxes having a timing mechanism adapted to measure the time interval between the time of the reception of data and the time of retransmission of said data.

5. A clock synchronization system as recited in claim 1 in which multiple data generating devices are connected to a central computer by data transmission means, said data transmission means having timing mechanisms adapted to measure the time interval between the receipt of said data and the retransmission of said data.

* * * * *